(12) United States Patent
DeHerrera

(10) Patent No.: US 12,172,605 B2
(45) Date of Patent: Dec. 24, 2024

(54) COLLAPSIBLE ROOF RACK

(71) Applicant: Michael DeHerrera, Santa Clarita, CA (US)

(72) Inventor: Michael DeHerrera, Santa Clarita, CA (US)

( * ) Notice: Subject to any disclaimer, the term of this patent is extended or adjusted under 35 U.S.C. 154(b) by 16 days.

(21) Appl. No.: 18/050,691

(22) Filed: Oct. 28, 2022

(65) Prior Publication Data

US 2024/0140322 A1 May 2, 2024

(51) Int. Cl.
*B60R 9/045* (2006.01)

(52) U.S. Cl.
CPC .................................. *B60R 9/045* (2013.01)

(58) Field of Classification Search
CPC ...................................................... B60R 9/045
USPC .......................................................... 224/320
See application file for complete search history.

(56) References Cited

U.S. PATENT DOCUMENTS

| | | | | |
|---|---|---|---|---|
| 2,387,779 | A * | 10/1945 | Strauss | B60R 9/045 224/325 |
| 3,512,082 | A * | 5/1970 | Joos | B60R 9/045 224/330 |
| 4,632,289 | A * | 12/1986 | Morissette | B60R 9/045 224/314 |
| 7,798,381 | B2 * | 9/2010 | Moreau | B60R 9/045 224/314 |
| 11,691,570 | B2 * | 7/2023 | Perkins | B60P 3/341 224/320 |
| 2008/0149675 | A1 * | 6/2008 | Moreau | B60R 9/045 224/320 |

* cited by examiner

*Primary Examiner* — Peter N Helvey
(74) *Attorney, Agent, or Firm* — Knobbe, Martens, Olson & Bear, LLP

(57) ABSTRACT

Roof racks for carrying items for a vehicle are disclosed herein. The roof rack may include a plurality of support members, two elongate members, and a plurality of braces on each elongate member. The elongate members may fit within the rain gutters of a vehicle. Each of the support members may comprise a first end portion and a second end portion. The first end portion of a support member may be configured to slip fit in a receiver on one of the two elongate members and the second end portion of the support member may be configured to slip fit in a receiver on the other of the two elongate members. Items may be secured to the roof rack with one or more straps.

16 Claims, 7 Drawing Sheets

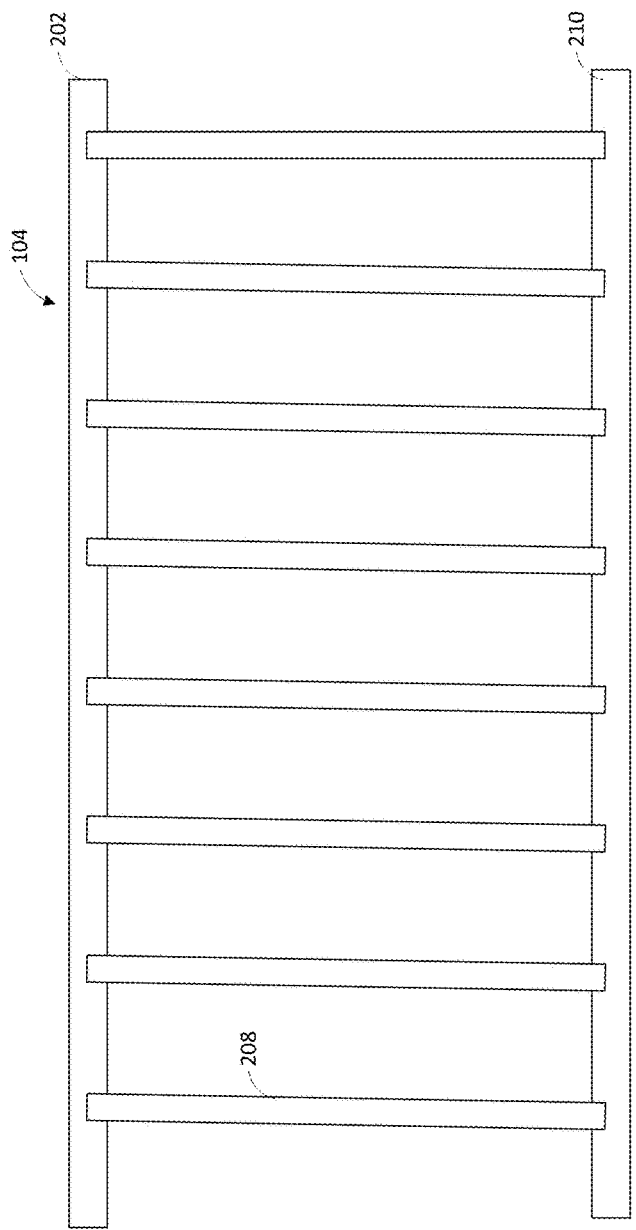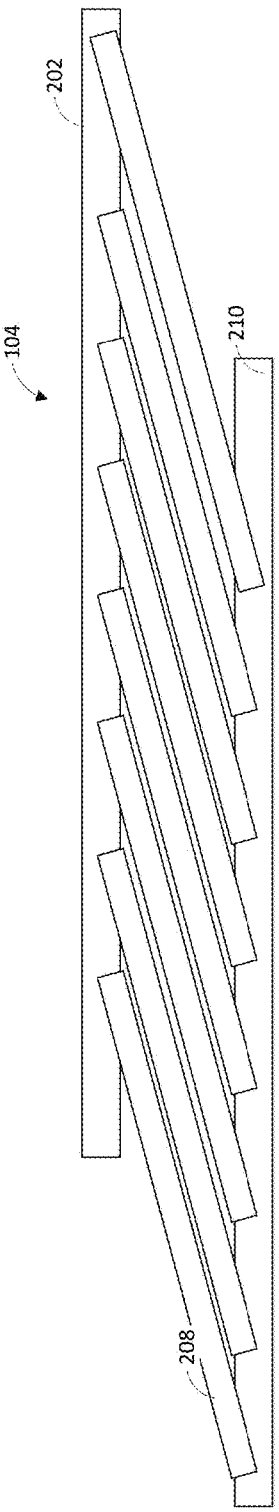
FIG. 6A
FIG. 6B

COLLAPSIBLE ROOF RACK

BACKGROUND

Roof racks can be used to transport items, such as luggage, bicycles, surf boards, kayaks, canoes, etc., on the roof of a vehicle that may otherwise be unable to be transported within the vehicle or at least inconvenient to transport within the vehicle.

SUMMARY

Roof racks can be challenging to use. For example, it may be desirable to remove a roof rack from the roof of a vehicle when not in use. However, roof racks may not be easily removed, and once removed, roof racks may be burdensome to reattach to the roof of a vehicle. Additionally, when not in use, it can be difficult to store a roof rack due to its large size.

Roof racks can also damage vehicles. For example, a roof rack can have supports that rest on the middle portion of a roof of a vehicle, which is not designed to support heavy loads, resulting in damage, such as bending or denting, to the roof of the vehicle. Furthermore, resting a load on the middle portion of a vehicle's roof can be insecure, allowing the roof rack to be easily jostled and moved during transportation.

Disclosed herein are roof racks that may at least solve one or more of the problems identified above among others. Disclosed herein are roof racks that can be disposed on the roof a vehicle to transport one or more items. The roof rack can be collapsed when not in use to enable convenient storage. The roof rack can include two elongate members (e.g., two elongate rails) that can be disposed in the gutters on the roof of a vehicle and/or the lateral side portions of the roof of the vehicle. The positioning of the two elongate members in the gutters can enable a user to quickly position the roof rack on the vehicle and/or help secure the roof rack in place on the roof to avoid inadvertent movement during transportation. A plurality of support members (e.g., struts) can extend between the two elongate members to suspend an item disposed on the support members above the middle portion of the vehicle's roof. Suspending the item on the support members above the middle portion of the roof can avoid damage to the middle portion of the roof. The support members and two elongate members can be rotatably coupled together to enable the roof rack to be collapsed for storage. For example, the two elongate members can be moved closer to each other to decrease the width of the roof rack. In some instances, the support members can be decoupled from the two elongate supports to allow for convenient disassembly.

The roof racks disclosed herein may include a plurality of support members. Each support member of the plurality of support members may have a first end portion and a second end portion. The roof rack may include two elongate members that can be arranged parallel to each other. In some examples, the first end portion of each support member can be rotatably coupled to one of the two elongate members and the second end portion of each support member can be rotatably coupled to the other of the two elongate members. In some examples, the rack can be positioned in a collapsed configuration with the two elongate members adjacent to each other and a deployed configuration with the two elongate members spaced away from each other.

In some examples, each support member may be curved towards each end of the support member. In some examples, the elongate members can be disposed in gutters on the roof of the vehicle. In some examples, each of the first and second end portion of each support member may be connected to one of the elongate members through one of a plurality of receivers attached to each of the elongate members. In some examples, each of the first and second end portions of each support member can be slip fit in one of the plurality of receivers. In some examples, the rack may be secured to the vehicle by straps routed through the interior of the car. In some examples, the straps can be ratchet straps. In some examples, the rack may support a load up to about 150 pounds. In some examples, each support member may rotate to enable the rack to be reconfigured between the deployed configuration and the collapsed configuration. In some examples, each support member may rotate about 45°. In some examples, the space occupied by the rack in a deployed configuration may be larger than the space occupied by the rack in a collapsed configuration. In some examples, the elongate members and the support members may be decoupled from each other.

In another example, a roof rack is disclosed herein that may be disposed on a roof of a vehicle. The roof rack may include a plurality of struts. Each strut may have a first end portion and a second end portion. Each support struts may be curved towards the first and second ends. The roof rack may include two elongate rails that may be arranged parallel to each other. The elongate rails may include a plurality of receivers. In some examples, the first end portion of each strut may be rotatably coupled to one of the two elongate rails and the second end portion of each strut may be rotatably coupled to the other of the two elongate rails. In some examples, the roof rack may be positioned in a collapsed configuration with the two elongate rails closer to each other compared to a deployed configuration.

In some examples, the first end portion and second end portion of each strut may be slip fit into a corresponding receiver. In some examples, the roof rack may support a load up to about 150 pounds. In some examples, each strut may rotate in a transition from a deployed configuration to a collapsed configuration. In some examples, each strut may rotate about 45°. In some examples, the elongate rails and the struts may be decoupled from each other.

In another example, a kit is disclosed herein. The kit may include a plurality of struts. Each strut may have a first end portion and a second end portion. The kit may include two elongate rails. Each elongate rail may include a plurality of receivers. In some examples, the first end portion of each strut may be slip fit in one of the receivers on the one of the two elongate rails and the second end portion of each strut may be slip fit in one of the receivers on the other of the two elongate rails. In some embodiments, each strut may be curved at the first end portion and the second end portion.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes and should in no way be interpreted as limiting the scope of the embodiments. Furthermore, various features of different disclosed embodiments can be combined to form additional embodiments, which are part of this disclosure.

FIG. 6A shows a schematic drawing of a roof rack in a deployed configuration according to some embodiments.

FIG. 6B shows a schematic drawing of a roof rack in a collapsed configuration according to some embodiments.

DETAILED DESCRIPTION OF THE PREFERRED EMBODIMENT

Although certain embodiments and examples are described below, this disclosure extends beyond the specifically disclosed embodiments. Thus, it is intended that the scope of this disclosure should not be limited by any particular embodiments described below. Disclosed herein are roof racks that may be lightweight and/or foldable. The roof racks disclosed herein may be especially advantageous for vehicles which do not have a built-in roof rack.

Figure 1A:
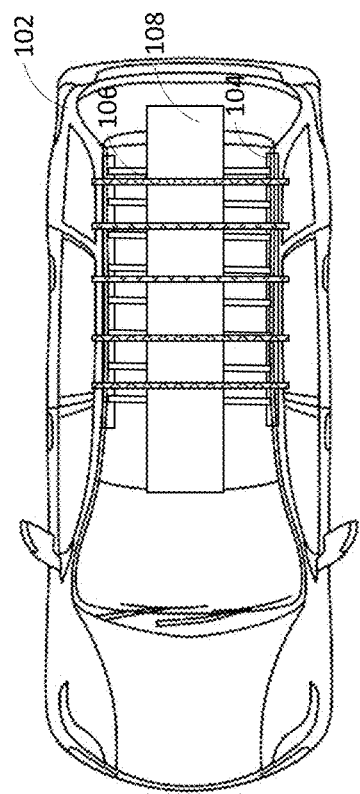
FIG. 1A depicts a top-down view of a roof rack attached to the roof of a vehicle according to some embodiments.
Figure 1B:
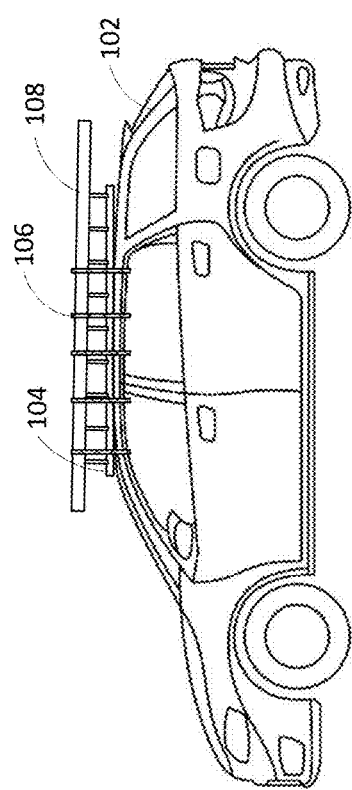
FIG. 1B depicts a side view of a roof rack attached to the roof of a vehicle according to some embodiments.

FIGS. 1A and 1B depict a non-limiting example of a roof rack 104 attached to a vehicle 102 according to some embodiments. As illustrated in FIGS. 1A and 1B, in some embodiments, a roof rack 104 may be attached to a roof of a vehicle 102, such as a car. In some embodiments, the folding rack 104 may be used to transport items 108 by securing the items 108 to the roof rack 104. The roof rack 104 may be able to transport flat items, irregular items, or other items. In some embodiments, the items may be suspended above the roof of the vehicle 102 and secured to the roof rack 104. In some embodiments, the item 108 may include the non-liming examples: bike, board (surfboard, paddle board, snowboard, skateboard, longboard, skis, buggie board, or the like), kayak, canoe, luggage, ladder, cargo box, and/or other items.

Figure 2:
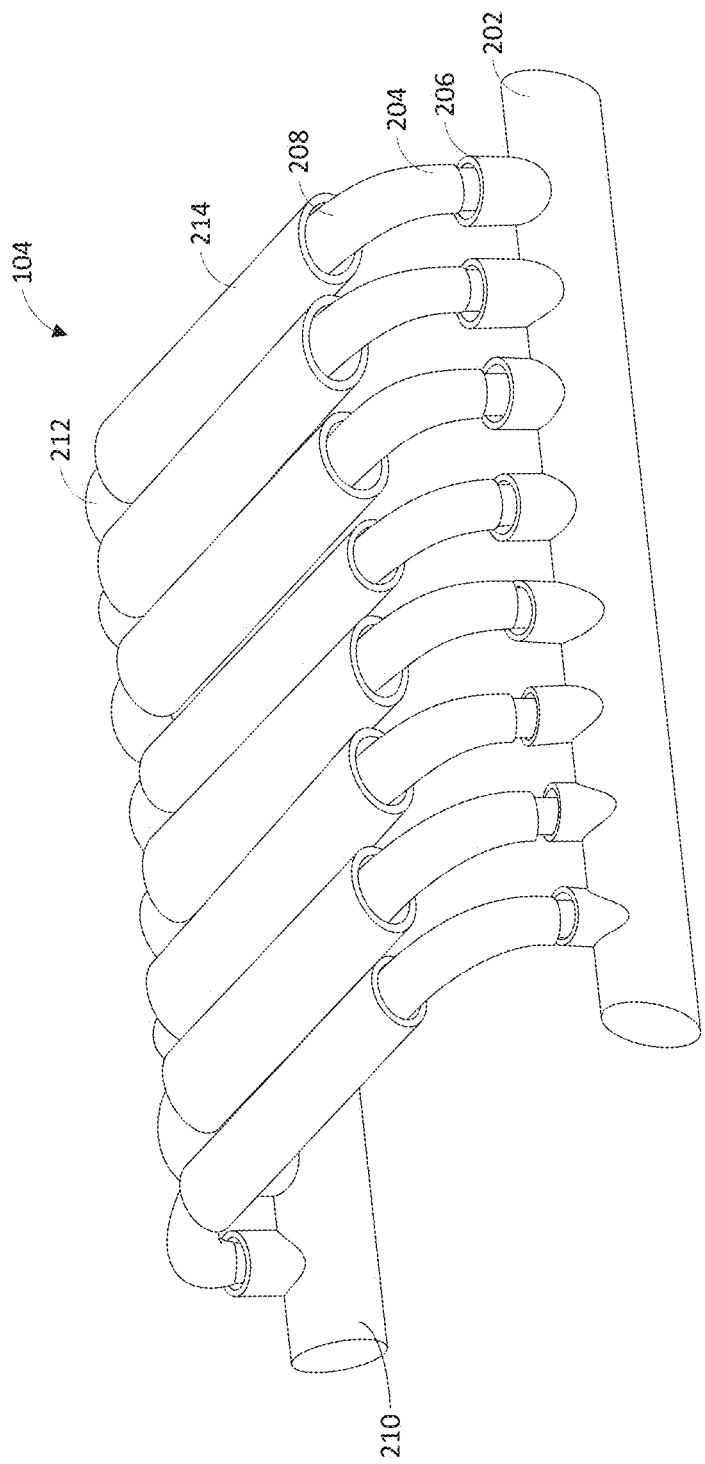
FIG. 2 shows a perspective view of a roof rack in a use state (e.g., expanded configuration, deployed configuration) according to some embodiments.

FIG. 2 illustrates a perspective view of a roof rack 104 in a deployed configuration (e.g., expanded, use state, etc.) that can be used to carry items on the roof of a vehicle according to some embodiments. As shown in FIG. 2, the roof rack 104 can include two elongate members 202, 210, which may be rails, rods, bars, struts, supports, tubes, etc. In some embodiments, the elongate members 202, 210 may be disposed on and/or in the rain gutters of a vehicle, which can secure the roof rack 104 in place and/or avoid damage to the middle portion of the roof of the vehicle. In some embodiments, the elongate members 202, 210 may fit within the rain gutters of the vehicle. In some embodiments, the elongate members 202, 210 may positioned on the lateral portions of a vehicle's roof. In some embodiments, the two elongate members 202, 210 may be parallel. In some embodiments, the elongate members 202, 210 may be not parallel, which may be beneficial if the rain gutters of the vehicle are not parallel. For example, in some embodiments, the distance between the rain gutters may be tapered from front to rear or rear to front. In some embodiments, the elongate members 202, 210 may have different designs to be compatible with the configuration of the rain gutters of a vehicle. In some embodiments, the length of the elongate members 202, 210 may be designed to accommodate the length of the rain gutters. In some embodiments, the length of the elongate members 202, 210 may be shorter than the length of the rain gutters. In some embodiments, the length of the elongate members 202, 210 may be adjustable. In some embodiments, when the roof rack 104 is mounted onto a vehicle roof, the elongate members 202, 210 may be in contact with rain gutters of the vehicle. Advantageously, the area around rain gutters of a vehicle may have higher strength than the middle area of the roof of the vehicle. Thus, the roof rack 104, according to some embodiments, may support heavier items compared to roof racks that are disposed on the middle of a vehicle's roof.

Figure 7:
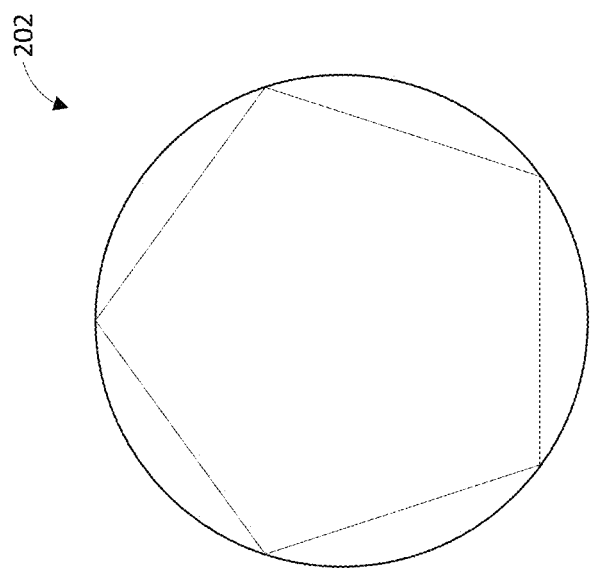
FIG. 7 shows an example of the cross section of an elongate member or support member.

In some embodiments, the elongate members 202, 210 may be hollow or solid. In some embodiments, the cross section of the elongate members may be a circle, oval, polygon (e.g., square, triangle, rectangle, parallelogram, pentagon, hexagon, heptagon, octagon, nonagon or decagon), irregular shape, and/or any other shape. In some embodiments, the elongate members 202, 210 may include an inner structure and an outer layer. In some embodiments, the outer surface of the inner structure may be in contact with the interior surface of the outer layer. In some embodiments, the cross section of the inner structure may be a circle, oval, polygon (e.g., square, triangle, rectangle, parallelogram, pentagon, hexagon, heptagon, octagon, nonagon or decagon), irregular shape, and/or any other shape. In some embodiments, the inner structure may be a lattice structure and/or honeycomb structure. In some embodiments, the cross section of the outer layer may be a circle, oval, polygon (e.g., square, triangle, rectangle, parallelogram, pentagon, hexagon, heptagon, octagon, nonagon or decagon), irregular shape, and/or any other shape. In some embodiments, the cross section of the elongate members 202, 210 may be a pentagon inside a circle or a honeycomb style. FIG. 7 shows an exemplary cross section of an elongate member 202. Advantageously, the elongate member comprising an inner structure and an outer layer may provide extra strength. In some embodiments, the elongate members 202, 210 may include an outer periphery that corresponds to the shape of the gutters of a vehicle's roof.

With continued reference to FIG. 2, the roof rack 104 may further include a plurality of receivers 206, which may be joints, sockets, tubes, slots, apertures, etc. In some embodiments, the receivers 206 may be attached to the elongate members 202 and 210. In some embodiments, the receivers 206 may be integrated with the elongate members 202, 210 by different methods. In some embodiments, the receivers 206 may be welded to the elongate members 202 and 210. In some embodiments, the receivers 206 may be formed together with the elongate members 202, 210 as integral parts. The receivers 206 may distributed along a length of the elongate members 202, 210. Each of the elongate members 202 can include a plurality of receivers 206, which may include 2, 3, 4, 5, 6, 7, 8, 9, 10, or more receivers 206. The receivers 206 on each elongate member 202 may all be oriented (e.g., facing, open to) the same direction. In some embodiments, the receivers 206 on each elongate member 202 may all be oriented (e.g., facing, open to) in different directions.

With continued reference to FIG. 2, the roof rack 104 may further include a plurality of support members 208, which may be struts, braces, cross supports, members, bars, tubes, rods, etc. In some embodiments, the roof rack 104 may include 2, 3, 4, 5, 6, 7, 8, 9, 10, or more support members 208. The number of support members 208 may correspond to the number of receivers 206. In some embodiments, the number of support members 208 may be selected to accommodate the items the roof rack 104 is designed to transport. In some embodiments, when an item or items are secured on the roof rack 104, the item or items may be in direct contact with the support members 208. In some embodiments, the support members 208 may be different lengths. In some embodiments, the support members 208 may be the same length.

Each support member 208 may include a first end portion 204 and a second end portion 212. In some embodiments, the support member may be curved towards and/or at the first end portion 204 and the second end portion 204 to be coupled to the elongate members 202, 210 (e.g., coupled to the receivers 206). The curve at the first end portion and/or the second end portion 212 may help to suspend an item supported by the roof rack 104 above the middle portion of a roof of a vehicle. In some embodiments, each of the first end portion 204 and second end portion 212 of each support member 208 may be configured to be rotatably coupled to one of the two elongate members 202, 210. In some embodiments, each support member 208 may be rotatably coupled to a receiver 206. In some embodiments, each support member 208 may be coupled to the elongate members 202, 210 by connecting the first end portion 204 or the second end portion 212 to a receiver 206. In some embodiments, each receiver 206 may be configured to connect the support member 208 with one of the elongate members 202, 210. In some variants, the first end portion 204 and/or the second end portion 212 may include a portion that may be disposed inside the receiver 206 to rotatably couple the support member 208 to the elongate members 202, 210. For example, each of the first end portion 204 and the second end portion 212 may include a projection that may be sized to fit within the receiver 206. In some variants, the first end portion 204 and/or second end portion 212 may be slip fit into the receiver 206. In some embodiments, the receiver 206 may include a projection that may extend into the first end portion 204 and/or second end portion 212 to rotatably couple the support member 208 to the elongate members 202, 210. In some embodiments, the support members 208 may be rotatably coupled with any of the receivers 206. In some embodiments, the first end portions 204 and/or second end portions 212 of the support members 208 may be sized and/or shaped to only couple with one receiver 206, one pair of receivers 206, or another subset of receivers 206. In some embodiments, the first end portion 204 and/or the second end portion 212 may include an angled segment that extends away from a longitudinal axis of the support member 208.

In some embodiments, the support member 208 may be hollow or solid. In some embodiments, the cross section of the support members 208 may be a circle, oval, polygon (e.g., square, triangle, rectangle, parallelogram, pentagon, hexagon, heptagon, octagon, nonagon or decagon), irregular shape, and/or any other shape. In some embodiments, the support member 208 may include an inner structure and an outer layer. In some embodiments, the outer surface of the inner structure may be in contact with the interior surface of the outer layer. In some embodiments, the cross section of the inner structure may be a circle, oval, polygon (e.g., square, triangle, rectangle, parallelogram, pentagon, hexagon, heptagon, octagon, nonagon or decagon), irregular shape, and/or any other shape. In some embodiments, the cross section of the outer layer may be a circle, oval, polygon (e.g., square, triangle, rectangle, parallelogram, pentagon, hexagon, heptagon, octagon, nonagon or decagon), irregular shape, and/or any other shape. In some embodiments, the cross section of the support member 208 may be a pentagon inside a circle or a honeycomb style. In some embodiments, the inner structure may be a lattice structure and/or honeycomb structure. Advantageously, the support member 208 may include an inner structure and an outer layer may provide additional strength.

With continued reference to FIG. 2, in some embodiments, the roof rack 104 may further include a plurality of surrounding members 214, which may be wraps, cushions, sleeves, pads, wrap pads, covers, etc. Each of the surrounding members 214 may be wrapped around each support member 208, which may include at the middle area of the support member 208. Advantageously, the surrounding members 214 may provide more friction when items are secured to the support bar. The surrounding member 214 may also absorb some shock and protect the items secured to the support members 208 when the vehicle passes uneven surface. In some embodiments, the surrounding member 214 may include polymer, which may include a foam polymer.

Figure 3:
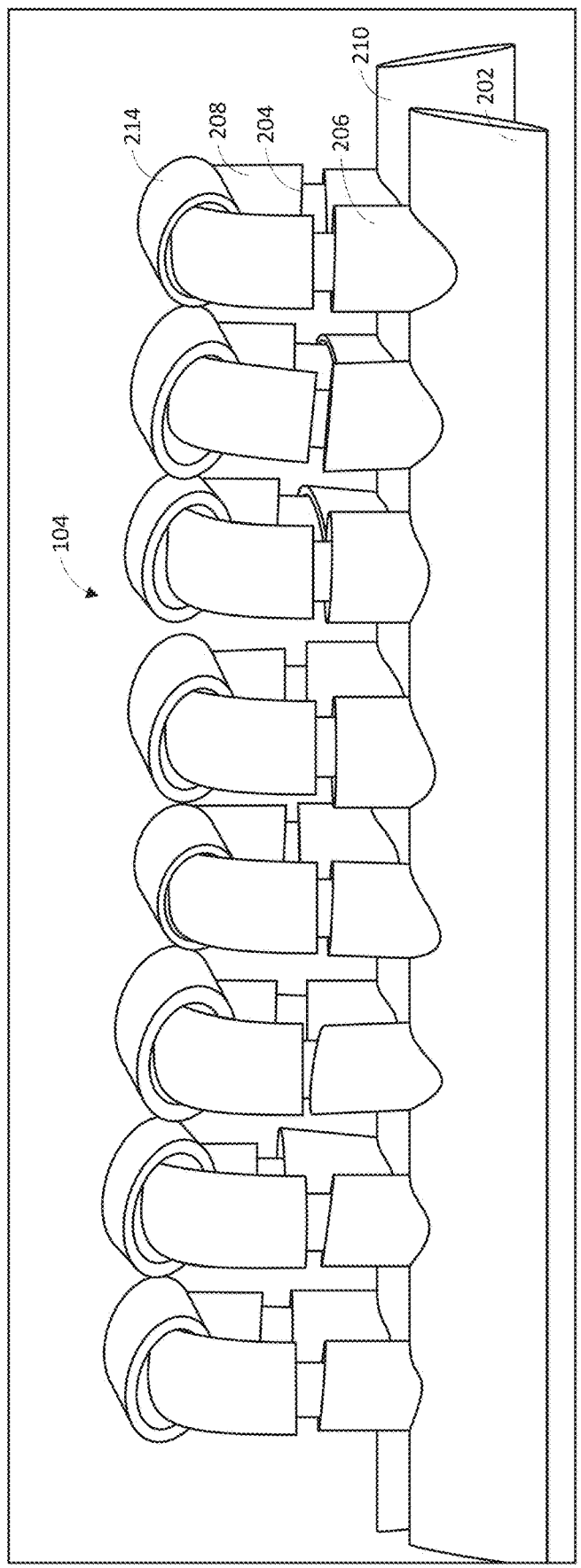
FIG. 3 shows a side view of a roof rack in a use state according to some embodiments.
Figure 4:
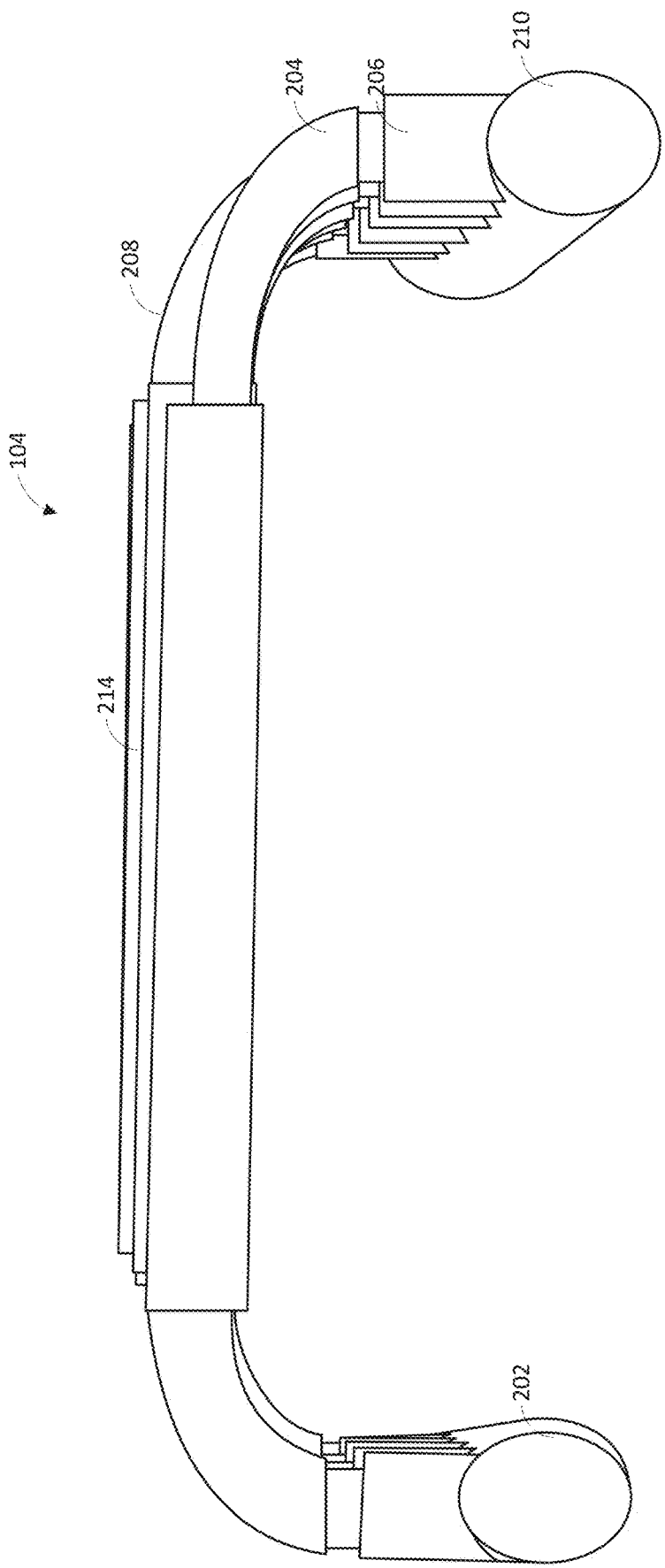
FIG. 4 shows a front view of a roof rack in a use state according to some embodiments.

FIG. 3 shows a side view of the roof rack 104 according to some embodiments. FIG. 4 shows a front view of the roof rack 104 according to some embodiments. As shown in FIGS. 3 and 4, in some embodiments, the support members 208 may be curved at the first end portions 204 and the second end portions 212, which may space the middle portions of the support members 208 a distance away from the middle portion of the vehicle roof. In some embodiments, the curved portion towards and/or at the first end portion 204 and second end portion 212 of each support member 208 may help divert a portion of the weight of loaded items outward, instead of downward. In some embodiments, the distance between the bottom of a support member 208 and the vehicle roof may be about 2 inches to about 8 inches, about 2 inches to about 6 inches, about 4 inches to about 5 inches, or any other ranges that may fit the use of the roof rack 104. In some embodiments, the distance between the bottom of a support member 208 and the vehicle roof may be less than 1, 2, 3, 4, 5, 6, 7, 8, 9, 10, or more inches or any distance between any of the foregoing values. In some embodiments, each support member 208 may be in contact with the item or items. In some embodiments, the support members 208 may distribute the weight of the load evenly over the entire roof rack 104 and/or the vehicle. Thus, the weight on each support member 208 in contact with the loaded items may be the same or similar, which may allow the roof rack 104 to carry heavier items, especially for items with different shapes or types. Moreover, the distance between the support member 208 and the vehicle roof may provide space for the support member 208 to flex and absorb shock when the vehicle is moving on uneven surface.

Figure 5:
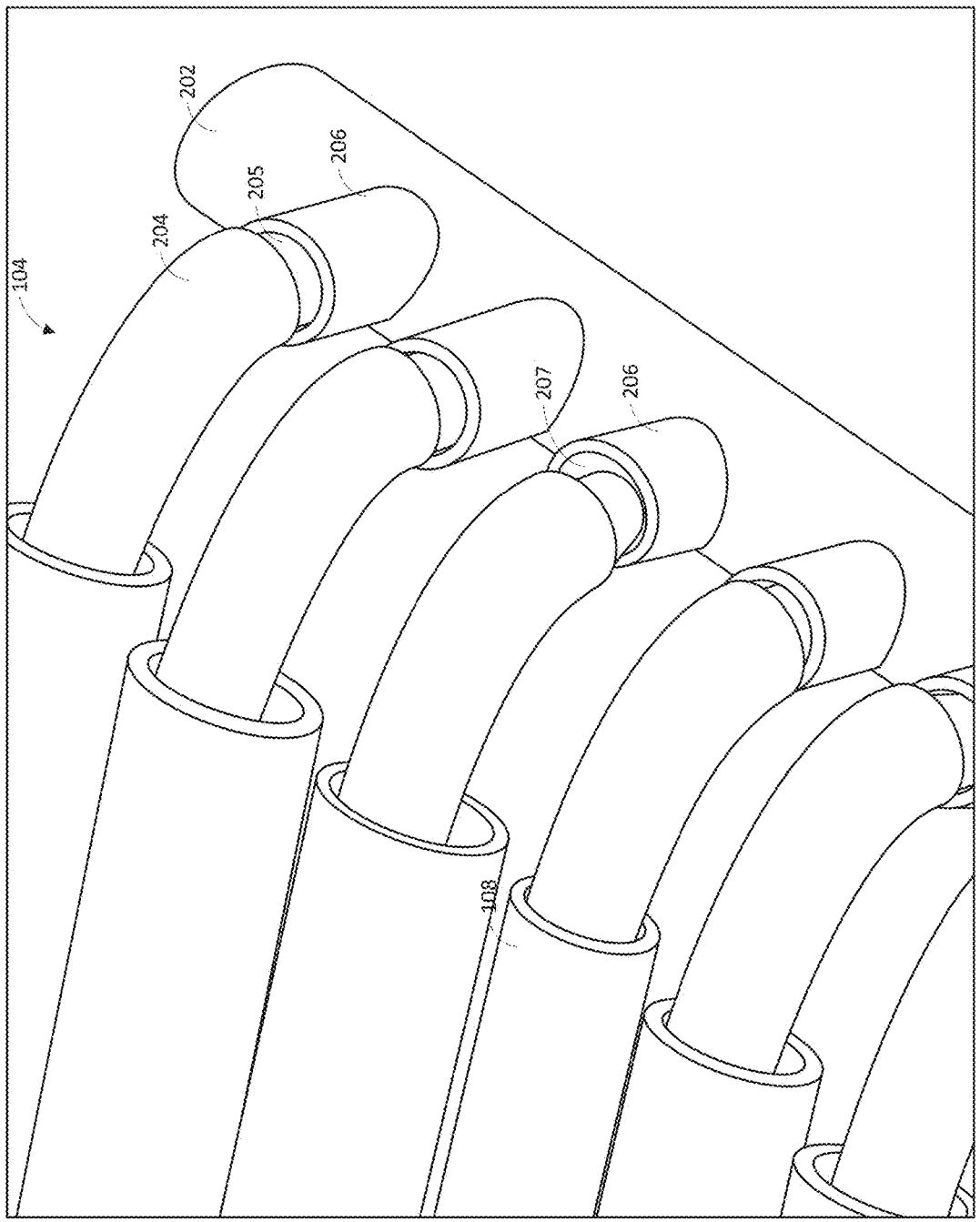
FIG. 5 shows an enlarged perspective view of the junction of at least some of the support members and an elongate member of a roof rack according to some embodiments.

FIG. 5 shows a close-up view of the roof rack 104 at the junction area between the receivers 206 and the support members 208 according to some embodiments. As shown in FIG. 5, the first end portion 204 may include a portion 205, which may be a projection, protrusion, tube, rod, bar, cylinder, member, etc. The portion 205 may be sized to fit in a receiver 206 disposed on the elongate member 202. For example, the receiver 206 may include an aperture 207 (e.g., hole, opening) into which the portion 205 may be inserted. In some embodiments, the portion 205 may be slip fit into the aperture 207 of the receiver 206. The portion 205 may be inserted into the aperture 207 of the receiver 206 such that the support member 204 may rotate relative to the elongate member 202, which may include rotating relative to the receiver 206. The rotation of the support member 202 relative to the elongate members 202 may allow the roof rack 104 to be collapsed (e.g., folded) as described herein and/or accommodate vehicle roofs, which may include gutters, of varying configurations. The second end portion 212 may be configured the same as or similar to the first end portion 204. As described herein, in some embodiments, the receiver 206 may include a protrusion, instead of the aperture 207, that may be inserted into an aperture of the first end portion 204 and/or second end portion 214.

With reference to FIGS. 1A and 1B, in some embodiments, the roof rack 104 and the items secured to the roof rack 104 may be attached to the roof of a vehicle by one or more straps 106, such as 1, 2, 3, 4, 5, or more straps. In some embodiments, the straps are tie-down compression straps. In some embodiments, the straps may be a ratchet style. In some embodiments, the one or more straps may go through the vehicle's interior (e.g., through the door openings of the vehicle). In some embodiments, the roof rack 104 may support a load up to about 300 pounds, 200 pounds, 150 pounds, or any other weight. In some embodiments, the roof rack 104 and the items may be secured separately, e.g., the roof rack 104 may be attached to the roof of a vehicle with one or more straps and the items may be secured to the roof rack 104 by another one or more straps.

Another aspect of this disclosure provides a kit for roof rack 104. The kit may include a plurality of support members 208, such as 2, 3, 4, 5, 6, 7, 8, 9, 10, or more support members 208. In some embodiments, each support member may include a first end portion 204 and a second end portion 212. The kit may further include two elongated members 202, 210. In some embodiments, each of the two elongate members 202, 210 may include a plurality of receivers 206. In some embodiments, the kit may further include a plurality of straps, such as 2, 3, 4, 5, 6, 7, 8, or more straps. In some embodiments, the kit may be assembled to form a roof rack 104 for a vehicle to carry items. In some embodiments, the first end portion 204 of each support member 208 may be coupled with (e.g., slip fit, inserted into, rotatably coupled with, etc.) a receiver 206 on one of the two elongate members 202, 210 and the second end portion 212 of each support member 208 may be configured to be coupled with (e.g., slip fit, inserted into, rotatably coupled with, etc.) a receiver 206 on the other of the two elongate members 202, 210.

Folding Mechanism

In some embodiments, the roof rack 104 may be reduced in size when the roof rack 104 is not in use. In some embodiments, the roof rack 104 may be compressed. In some embodiments, the roof rack 104 may be completely compressed. In some embodiments, the roof rack 104 may be dissembled. In some embodiments, the roof rack 104 may be folded to be more compact. In some embodiments, the roof rack 104 may be collapsed to be more compact.

FIG. 6A illustrates a top-down view of a roof rack 104 in a use state (e.g., deployed configuration, expanded configuration, etc.) according to some embodiments. FIG. 6B illustrates a non-limiting example of a top-down view of a roof rack 104 in a compressed state (e.g., folded configuration, collapsed configuration, storage configuration, etc.) according to some embodiments. As shown in FIG. 6B, all the support members 208 may rotate a certain degree. In some embodiments, the support members 208 may rotate up to about 70°, 65°, 60°, 55° 50°, 49°, 48°, 46°, 45°, 40°, or any other degree from the use state. After the rotations, the distance between the two elongate members 202, 210 may be reduced and the space the roof rack 104 occupies for storage may be less than the use state. In some embodiments, the elongate members 202, 210 may be closer together (e.g., adjacent, juxtaposed, proximate) to each other in a compressed state. Thus, the roof rack 104 may be stored inside of the vehicle in the compressed state or in other locations, such as a user's storage area (e.g., garage). As described herein, the support members 208 may rotate (e.g., pivot) relative to the elongate members 202, 210. Accordingly, the user may maneuver the elongate members 202, 210 to be closer together while remaining rotatably coupled to the support members 208, as shown in FIG. 6B, in the collapsed configuration comparted to the deployed configuration.

In some embodiments, each support member 208 may be paired with one receiver 206 on each elongate member 202, 210. In some embodiments, the first end portion 204 and the second end portion 206 of the support member 208 may be coupled to the elongate member 202, 210 by way of receivers 206. In some embodiments, the first end portion 204 or the second end portion 206 of the support member 208 may form a slip fit or friction fit with a receiver 206 on the elongate member 202, 210 to connect. In some embodiments, a receiver 206 may include a hole 207 to accommodate the first end portion 204 and/or second end portion 212 of the support member 208. In some embodiments, the first end portion 204 and/or second end portion 212 of the support member 208 may be inserted into the hole 207 of the receiver 206. When the loaded items are secured to the roof rack 104, the weight of the loaded items and the force from the tightened straps may be distributed among all the support members 208 or a subset thereof. Thus, there may be a downward force applied to the first end portion 204 and/or second end portion 212 of the support members 208 when loaded items are secured to the roof rack 104. The downward force applied on the first end portion 204 and/or or second end portion 212 of the support members 208 may facilitate slip fitting the first end portion 204 and/or second end portion 212 of a support member 208 into the hole 207 of a receiver 206, such that the support member 208 may be locked in the position and may not inadvertently move during the transition of the items. When the loaded items are removed from the roof rack 104, the downward force applied to the first end portion 204 and second end portion 212 of each support member 208 may be significantly reduced, and the first end portion 204 and second end portion 212 of a support member 208 and the associated receiver 206 may not be in a locked configuration and may be able to rotate relative to each other to be placed in the collapsed configuration.

In another embodiment, the roof rack 104 may be disassembled completely into parts to reduce the space. In some embodiments, the support members 208 may be decoupled from the elongate members 202, 210. In those embodiments, the space to store the parts of roof rack 104 may be less than the space to store the roof rack 104 in a use state. In some embodiments, the roof rack 104 may be assembled easily from the parts.

Adjustable Support Member

In some embodiments, the width of the roof rack 104 may be adjusted to accommodate the different widths of the roofs of different vehicles. In some embodiments, the width of the roof rack 104 may be adjusted through the adjustment of the length of the support members 208. In some embodiments, the support members 208 may be adjusted to ensure that the elongate members are in contact with the rain gutters no matter what the distance between the rain gutters is on different vehicles.

In some embodiments, each of the support members 208 comprises a plurality of support member parts, which may also be called secondary support members. In some embodiments, each support member comprises 2, 3, 4, 5, 6, 7, 8, 9, 10, 11, 12, 13, 14, 15, 17, 19, 20, or more support member parts. For example, the support members 208 may be modular to facilitate various lengths. In some embodiments, one or more of the support member parts of a support member 208 may comprise a connecting or fastening mechanism at each end of the one or more support member parts. In some embodiments, the connecting or fastening mechanism comprises fasteners such as integral fasteners, threaded fasteners such as screws, bolts, non-threaded fasteners, telescoping post, etc. In some embodiments, the connecting or fastening mechanisms at each end of the same support member part may be complementary to each other, for example, a support member part may comprise a female screw component at one end and a male screw component at the other end. In some embodiments, based on the desired length of the support member 208, one or more of the support member parts may be left out when connecting the support member parts to form the support member 208.

In some embodiments, the length of the support member parts may be the same or different from each other. In some embodiments, the length of at least one of the support member parts may be about 5 cm, 10 cm, 15 cm, 20 cm, 25 cm, 30 cm, 35 cm, 40 cm, 50 cm, 55 cm, 60 cm, 65 cm, 70 cm, 75 cm, 80 cm, 85 cm, 90 cm, 95 cm, 100 cm, or any other length.

In another embodiment, the support member 208 comprises a first support member part and a second support member part. In some embodiments, the first support member part may be inserted into the second support member part at least partially. In some embodiments, the support members 208 may telescope to different lengths and be locked at a length, which may include sliding the first support member part within the second support member part. In some embodiments, the first support member part may be inserted into the second support member part to the extent that the length of the support member is desired. In some embodiments, the relative position of the first and second support member parts may be fixed through a fastening mechanism. In some embodiments, the fastening mechanism is a telescopic pole locking mechanism. In some embodiments, the first support member part comprises a push button approaching the end where the first support member is inserted into the second support member. In that embodiment, the second support member comprises a column of through-holes along the second support member approaching the end where the first support member is inserted. In some embodiments, the relative position of the first and second support member parts is locked when the push button comes out from a certain through-hole. In some embodiments, a user may press the push button and then twist and pull or push the first and/or the second support member part to match the push button with another through-hole. In some embodiments, the first support member part also comprises a column of through-holes at the end where the first support member part may be inserted into the second support member part. In some embodiments, the column of the through-holes on the first support member part may match with the column of the through-holes on the second support member part. In some embodiments, after the first support member part is inserted into the second support member part and at least one of the through-holes on the first support member part matches with a through-hole on the second support member. In that embodiment, a fastening or fixing mechanism such as screw, bolt, pin, rivet, may be used to fix the relative position of the first and second support member parts.

Material

In some embodiments, the roof rack 104 may include different materials. In some embodiments, the elongate members 202, 210, receivers 206, and support members 208 may include polymers, fibers, metals, plastics, or a combination thereof. In some embodiments, the elongate members 202, 210, receivers 206, and support members 208 may include a combination of plastic and fiber. In some embodiments, the elongate members 202, 210, receivers 206, and support members 208 may include fiber reinforced plastic. In those embodiments, the fiber for the fiber reinforced plastic may include different lengths, such as short cut, long cut, full length, or chopped length. In some embodiments, the elongate members 202, 210, receivers 206, and support members 208 may include a Nylon reinforced plastic.

Terminology

Although certain embodiments and examples have been described herein, it will be understood by those skilled in the art that many aspects of the delivery systems shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Phrases preceded by a term such as "substantially" include the recited phrase and should be interpreted based on the circumstances (e.g., as much as reasonably possible under the circumstances).

What is claimed is:

1. A rack configured to be disposed on a roof of a vehicle, the rack comprising:
   a plurality of support members, each support member of the plurality of support members having a first curved end portion and a second curved end portion, and
   two elongate members configured to be arranged parallel to each other, wherein each of the two elongate members comprise a plurality of vertically oriented sockets,
   wherein the first curved end portion of each support member is configured to be inserted with a slip fit into one of the plurality of vertically oriented sockets of one of the two elongate members and the second curved end portion of each support member is configured to be inserted with a slip fit into one of the plurality of vertically oriented sockets of the other of the two elongate members to permit relative rotation between the plurality of support members and the two elongate members, and
   wherein the rack is configured to be positioned in a collapsed configuration with the two elongate members adjacent to each other and a deployed configuration with the two elongate members spaced away from each other.

2. The rack of claim 1, wherein the two elongate members are configured to be disposed in gutters on the roof of the vehicle.

3. The rack of claim 1, wherein the rack is configured to be secured to the vehicle by one or more straps routed through an interior of the vehicle.

4. The rack of claim 3, wherein the one or more straps is a ratchet strap.

5. The rack of claim 1, wherein the rack is configured to support a load up to about 150 pounds.

6. The rack of claim 1, wherein each support member of the plurality of support members is configured to rotate to reconfigure the rack from the deployed configuration to the collapsed configuration.

7. The rack of claim 6, wherein each support member of the plurality of support members is configured to rotate about 45°.

8. The rack of claim 1, wherein the rack occupies a smaller volume of space in the collapsed configuration compared to the deployed configuration.

9. The rack of claim 1, wherein the two elongate members and the plurality of support members are configured to be decoupled from each other.

10. A roof rack configured to be disposed in disposed on a roof of a vehicle, the roof rack comprising:
    a plurality of struts, each strut having a first curved end portion and a second curved end portion; and
    two elongate rails, each including a plurality of vertically oriented sockets,
    wherein the first curved end portion of each strut of the plurality of struts is configured to be inserted with a slip fit into one of the plurality of vertically oriented sockets of one of the two elongate rails and the second curved end portion of each strut of the plurality of struts is configured to be inserted with a slip fit into one of the plurality of vertically oriented sockets of the other of the two elongate rails to permit relative rotation between the plurality of struts and the two elongate rails, and
    wherein the roof rack is configured to be positioned in a collapsed configuration and a deployed configuration with the plurality of struts rotatably coupled to the two elongate rails, the collapsed configuration comprising the two elongate rails arranged closer to each other compared to the deployed configuration.

11. The roof rack of claim 10, wherein the roof rack is configured to support a load up to about 200 pounds.

12. The roof rack of claim 10, wherein each strut of the plurality of struts is configured to rotate to reconfigure the roof rack between the deployed configuration and the collapsed configuration.

13. The roof rack of claim 12, wherein each strut of the plurality of struts is configured to rotate about 45°.

14. The roof rack of claim 10, wherein the two elongate rails and the plurality of struts may be decoupled from each other.

15. A kit for a roof rack, the kit comprising:
    a plurality of struts, each of the plurality of struts comprising a first curved end portion and a second curved end portion; and
    two elongate rails, each of the two elongate rails comprising a plurality of vertically oriented sockets,
    wherein the first curved end portion of each strut of the plurality of struts is configured to be inserted with a slip fit into one of the plurality of vertically oriented sockets on one of the two elongate rails and the second curved end portion of each strut of the plurality of struts is configured to be inserted with a slip fit into one of the plurality of vertically oriented sockets on the other of the two elongate rails to permit relative rotation between the plurality of struts and the two elongate rails.

16. The kit of claim 15, wherein the first curved end portion and the second curved end portion of each strut comprises a protrusion configured to be inserted into the plurality of vertically oriented sockets of the two elongate rails.

* * * * *